United States Patent
Kolman et al.

(10) Patent No.: US 9,462,009 B1
(45) Date of Patent: Oct. 4, 2016

(54) DETECTING RISKY DOMAINS

(71) Applicant: EMC Corporation, Hopkinton, MA (US)

(72) Inventors: Eyal Kolman, Tel Aviv (IL); Alex Vaystikh, Herzelia (IL); Alon Kaufman, Herut (IL); Ereli Eran, Tel Aviv (IL); Eyal Gruss, Kiryat Ono (IL)

(73) Assignee: EMC Corporation, Hopkinton, MA (US)

( * ) Notice: Subject to any disclaimer, the term of this patent is extended or adjusted under 35 U.S.C. 154(b) by 2 days.

(21) Appl. No.: 14/501,485

(22) Filed: Sep. 30, 2014

(51) Int. Cl.
*H04L 29/06* (2006.01)

(52) U.S. Cl.
CPC .................................. *H04L 63/1425* (2013.01)

(58) Field of Classification Search
CPC ........... H04L 63/1408; H04L 63/1433; H04L 63/1425
See application file for complete search history.

(56) References Cited

U.S. PATENT DOCUMENTS

| | | | | |
|---|---|---|---|---|
| 8,468,271 B1* | 6/2013 | Panwar | ............... | G06Q 30/0615 370/469 |
| 2008/0120699 A1* | 5/2008 | Spear | ...................... | H04L 63/10 726/4 |
| 2008/0270203 A1* | 10/2008 | Holmes | .................. | G06Q 10/04 705/7.28 |
| 2009/0012925 A1* | 1/2009 | Brown | .................... | G06Q 30/02 706/46 |
| 2009/0287657 A1* | 11/2009 | Bennett | ............. | G06F 17/30867 |
| 2011/0276716 A1* | 11/2011 | Coulson | ............ | G06F 17/30887 709/238 |
| 2012/0041790 A1* | 2/2012 | Koziol | .................... | G06Q 40/08 705/4 |
| 2012/0220478 A1* | 8/2012 | Shaffer | ................ | C12Q 1/6886 506/9 |
| 2012/0221486 A1* | 8/2012 | Leidner | .................. | G06Q 40/08 705/36 R |
| 2013/0151508 A1* | 6/2013 | Kurabayashi | ....... | G06F 17/2223 707/723 |
| 2013/0198119 A1* | 8/2013 | Eberhardt, III | ........ | G06N 7/005 706/12 |
| 2013/0311905 A1* | 11/2013 | Czyzewicz | ........... | G06F 3/0482 715/753 |
| 2013/0318603 A1* | 11/2013 | Merza | .................. | H04L 63/1441 726/22 |
| 2014/0019171 A1* | 1/2014 | Koziol | .................... | G06Q 40/08 705/4 |
| 2014/0147048 A1* | 5/2014 | Yang | .................. | G06F 17/30707 382/190 |
| 2014/0189098 A1* | 7/2014 | MaGill | ................ | H04L 63/1425 709/224 |
| 2014/0280684 A1* | 9/2014 | Hammond | .............. | G06F 17/30 709/213 |
| 2014/0365281 A1* | 12/2014 | Onischuk | ............... | G07C 13/00 705/12 |
| 2015/0195299 A1* | 7/2015 | Zoldi | .................. | H04L 63/1433 726/25 |
| 2015/0281450 A1* | 10/2015 | Shapiro | ............... | H04M 3/4878 379/265.09 |

\* cited by examiner

*Primary Examiner* — Hadi Armouche
*Assistant Examiner* — Ali Shayanfar
(74) *Attorney, Agent, or Firm* — Krishnendu Gupta; Jason A. Reyes

(57) ABSTRACT

There is disclosed a technique for detecting risky domains. The technique comprises collecting information in connection with a domain. The technique also comprises generating a profile comprising at least one metric associated with the domain based on the collected information. The technique further comprises determining the riskiness in connection with the domain based on the generated profile.

18 Claims, 5 Drawing Sheets

DETECTING RISKY DOMAINS

RELATED APPLICATION

This application is a continuation-in-part application claiming priority to co-pending U.S. patent application Ser. No. 14/039,881, filed Sep. 27, 2013, reference no. EMC-13-0123, entitled "DETECTING RISKY NETWORK COMMUNICATIONS BASED ON BEHAVIOR PROFILING", the entirety of which patent application is hereby incorporated by reference herein.

TECHNICAL FIELD

The present invention relates generally to network security. More specifically, the present invention relates to detecting risky domains.

BACKGROUND OF THE INVENTION

One conventional approach to preventing malicious activity on a computer network is to scan network traffic for malicious signatures listed on a signature blacklist. For example, network devices such as a firewall can be configured to block network traffic containing a specific domain (i.e., website), a specific IP address, or a specific Uniform Resource Locator (URL). Some network devices may even block network traffic if the network devices find blacklisted signatures within files, javascript and/or Flash objects.

Another conventional approach to preventing malicious activity on a computer network is to intercept network traffic containing potentially malicious code and then run that code in a sandbox (i.e., a computerized platform which is isolated from the network). If the code running in the sandbox turns out to be malicious (e.g., by infecting a sandbox device with a computer virus, by attempting to spread malware, by attempting to extract data and communicate that data to an attacker's device, etc.), the effects are contained and prevented from spreading to devices on the network.

Unfortunately, there are deficiencies to the above-described conventional approaches to preventing malicious activity on a computer network. For example, there are many threats that go undetected by blacklists such as those having newer malicious signatures that have not yet been added to the blacklists Additionally, experimenting with potentially malicious code in a sandbox typically requires close and extensive attention from a human expert.

SUMMARY OF THE INVENTION

There is disclosed a computer-implemented method, comprising: collecting information in connection with a domain; based on the collected information, generating a profile comprising at least one metric associated with the domain; and based on the generated profile, determining the riskiness in connection with the domain.

There is also disclosed an apparatus, comprising: at least one processing device, said at least one processing device comprising a processor coupled to a memory; wherein the apparatus is configured to: collect information in connection with a domain; based on the collected information, generate a profile comprising at least one metric associated with the domain; and based on the generated profile, determine the riskiness in connection with the domain.

There is further disclosed a computer program product having a non-transitory computer-readable medium storing instructions, the instructions, when carried out by one or more processors, causing the one or more processors to perform a method of: collecting information in connection with a domain; based on the collected information, generating a profile comprising at least one metric associated with the domain; and based on the generated profile, determining the riskiness in connection with the domain.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Figure 1:
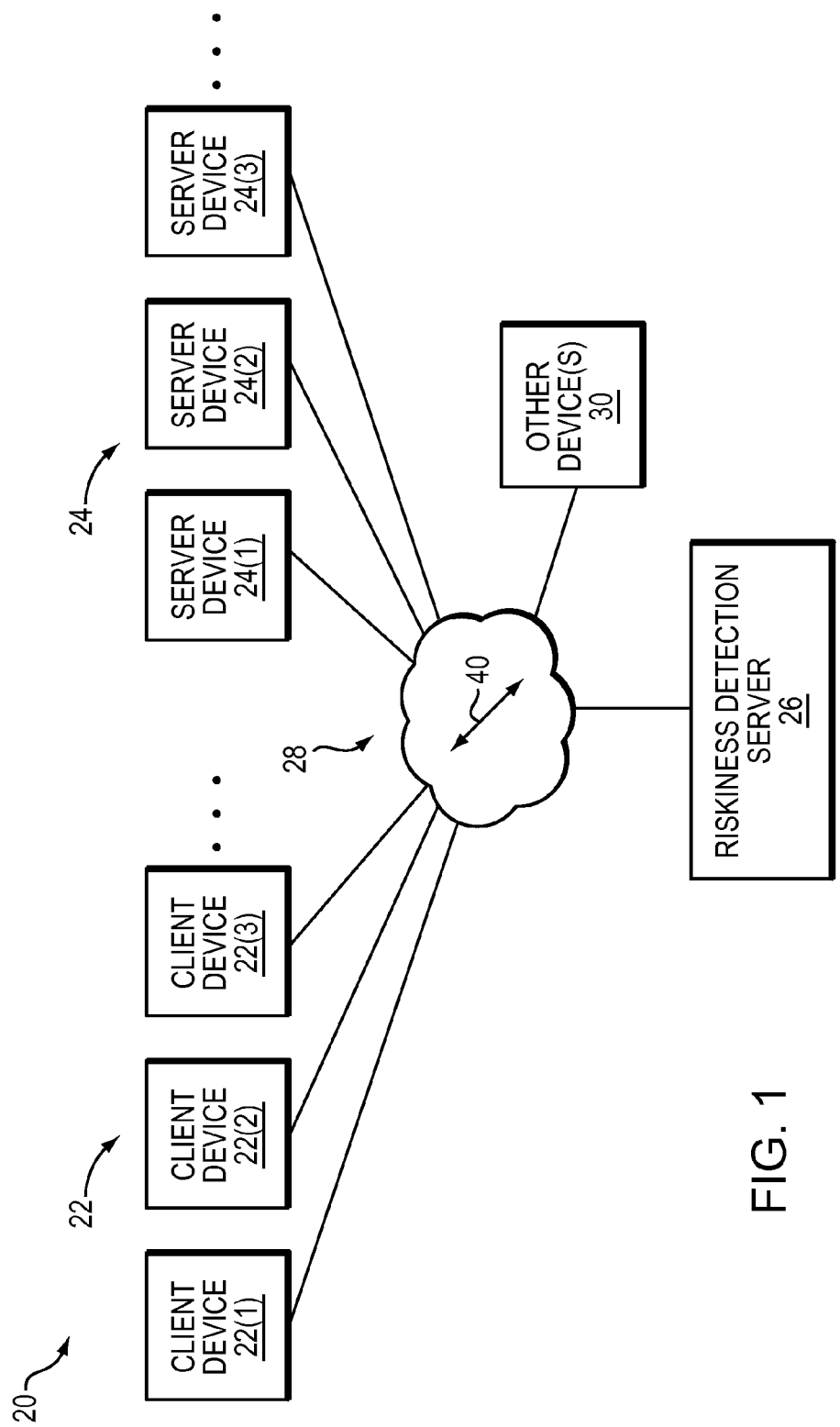
FIG. 1 is a block diagram of an electronic environment which detects risky domains.

FIG. 1 shows an electronic environment 20 which is equipped to detect risky domains. The electronic environment 20 includes client devices 22(1), 22(2), 22(3), . . . (collectively, client devices 22), server devices 24(1), 24(2), 24(3), . . . (collectively, server devices 24), a riskiness detection server 26, a communications medium 28, and perhaps other devices 30 as well.

Each client device 22 is constructed and arranged to acquire services from one or more of the server devices 24. Some examples of suitable client devices 22 include computerized user apparatus such as personal computers, laptops, tablets, smart phones, other devices that are capable of running browsers, and the like.

Each server device 24 is constructed and arranged to provide services to one or more of the client devices 22. Some examples of suitable server devices 24 include institutional or enterprise scale server apparatus such as web servers, file servers, and so on.

The riskiness detection server 26 is constructed and arranged to evaluate the riskiness of domains. Further, the riskiness detection server 26 is also constructed and arranged to assess the riskiness of communications. For example, if a communication attempts to access a risky domain then the communication may be blocked.

The communications medium 28 is constructed and arranged to connect the various components of the electronic network 20 together to enable these components to exchange electronic signals. At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, and so on.

The other devices 30 represent miscellaneous apparatus that may share use of the communications medium 28.

Examples of other devices 30 include network equipment, ancillary appliances, potentially malicious devices, and so on.

During operation, the various components of the electronic environment 20 communicate with each other to perform useful work. During such operation, the riskiness detection server 26 collects data and builds domain profiles from the collected data. After the riskiness detection server 26 has created the domain profiles, the riskiness detection server 26 assigns domain risk scores. Each domain risk score is a numerical measure of the riskiness of the domain. If the domain is risky then it may be classified as high risk such that any new communication that requests access to that particular domain may be blocked.

In some arrangements, the communications 40 includes a Hypertext Transfer Protocol (HTTP) message exchanged between a source device and a destination device. In these arrangements, the attributes of the communication 40 which are evaluated can include time, source IP address, destination IP address, domain, HTTP POST, user-agent string, HTTP method, full URL, HTTP status code, duration, timezone, website geolocation, the amount of data transmitted, the referrer and other header information, bytes sent/received, HTTP cookie presence, referrer address, employee location, employee department, combinations thereof, as well as others.

It should be understood that, although the riskiness detection server 26 is shown in FIG. 1 as residing off of a branch of the communications medium 28, there are a variety of suitable locations for the riskiness detection server 26 within the electronic environment 20 depending on the particular type of electronic environment 20. In some arrangements, the electronic environment 20 is large-scale enterprise network, and riskiness detection server 26 resides in one or more firewalls or gateways that separate the enterprise network from a public network in an inline manner. In other arrangements, the electronic environment 20 is a public network perhaps and the specialized firewall/gateway may separate different segments of the public network. In yet another arrangement, the electronic environment 20 is any network and the riskiness detection server 26 is simply an appliance attached to the network (e.g., a device which hooks into a network traffic blocking or filtering system, etc.). Other types of electronic environments and/or locations are suitable for use as well.

It should be further understood that, in some arrangements, the communications data that is collected and analyzed is organization-wide or even across multiple organizations (e.g., where the data is gathered at least in part from a public network). The domain profiles are then created and the riskiness detection server 26 looks for abnormal domains which stand out. Further details will now be provided with reference to FIG. 2.

Figure 2:
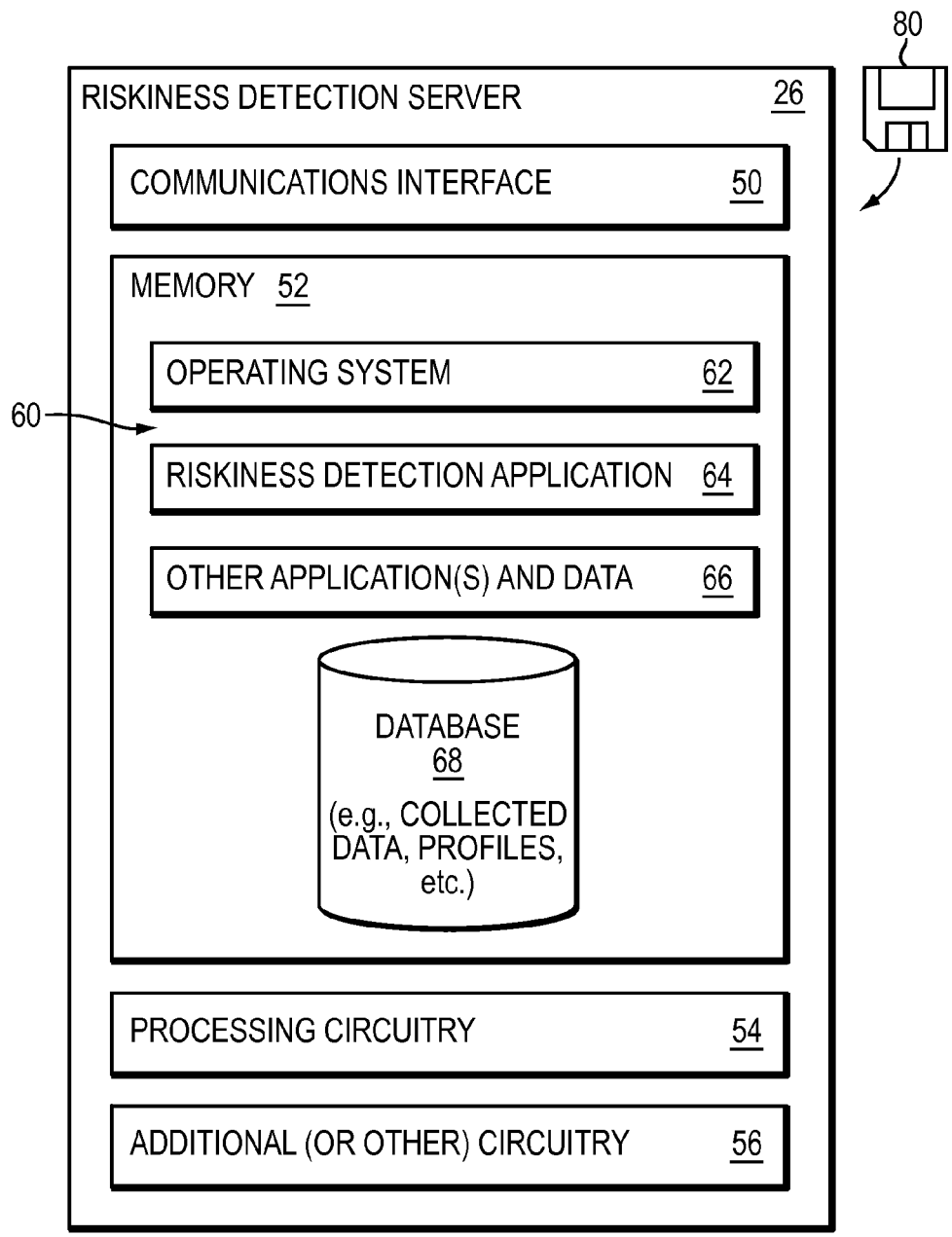
FIG. 2 is a block diagram of a riskiness detection server of the electronic environment of FIG. 1.

FIG. 2 shows particular details of the riskiness detection server 26 (also see FIG. 1). The riskiness detection server 26 includes a communications interface 50, memory 52, processing circuitry 54, and additional (or other) circuitry 56.

The communications interface 50 is constructed and arranged to connect the riskiness detection server 26 to the communications medium 28 to enable communications with other components of the electronic network 20 (FIG. 1). Additionally, the communications interface 50 enables the riskiness detection server 26 to potentially intercept and block communications if necessary.

The memory 52 is intended to represent both volatile storage (e.g., DRAM, SRAM, etc.) and non-volatile storage (e.g., flash memory, etc.). The memory 52 stores a variety of software constructs 60 including an operating system 62 to manage resources of the riskiness detection server 26, a riskiness detection application 64, other applications and data 66 (e.g., operating parameters, utilities, backend processing routines, reporting routines, etc.), and a network history database 68 (e.g., collected data, profiles, etc.).

The processing circuitry 54 is constructed and arranged to operate in accordance with the various software constructs 60 stored in the memory 52. Such circuitry 54 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 60 to the riskiness detection server 26. The computer program product 80 has a non-transitory (or non-volatile) computer readable medium which stores a set of instructions which controls one or more operations of the riskiness detection server 26. Examples of suitable computer readable storage media include tangible articles of manufacture and apparatus which store instructions in a non-volatile manner such as CD-ROM, flash memory, disk memory, tape memory, and the like.

The additional circuitry 56 represents other portions of the riskiness detection server 26. For example, the riskiness detection server 26 may include a user interface to enable a user to locally operate the riskiness detection server 26.

During operation, the processing circuitry 54 runs the riskiness detection application 64 to form specialized control circuitry suitable for detection of risky domains. In particular, the riskiness detection application 64 forms and maintains a set of domain profiles. The domain profiles are constructed from count and/or frequency data generated from prior communications 40 occurring in the electronic environment 20.

In some arrangements, the communications 40 include HTTP messages which pass between the client devices 22 (running web browsers) and server devices 24 (running web server applications), also see FIG. 1. HTTP messages are common even in environments which restrict network communications down to only essential protocols. Furthermore, HTTP messages offer a rich set of attributes from which to derive the domain profiles.

Additionally, the control circuitry of the riskiness detection server 26 determines the riskiness of the domains based on the domains profiles. For example, the riskiness may be expressed in the form of domain risk scores that are numerical measures of the riskiness of the domains. In this manner, the riskiness detection server 26 can be used to detect risky domains and prevent malicious activity from occurring in the electronic environment 20 in the future (e.g., by blocking communications 40, by focusing attention on certain domains, etc.). Further details will now be provided with reference to FIGS. 3 and 4.

Figure 3:
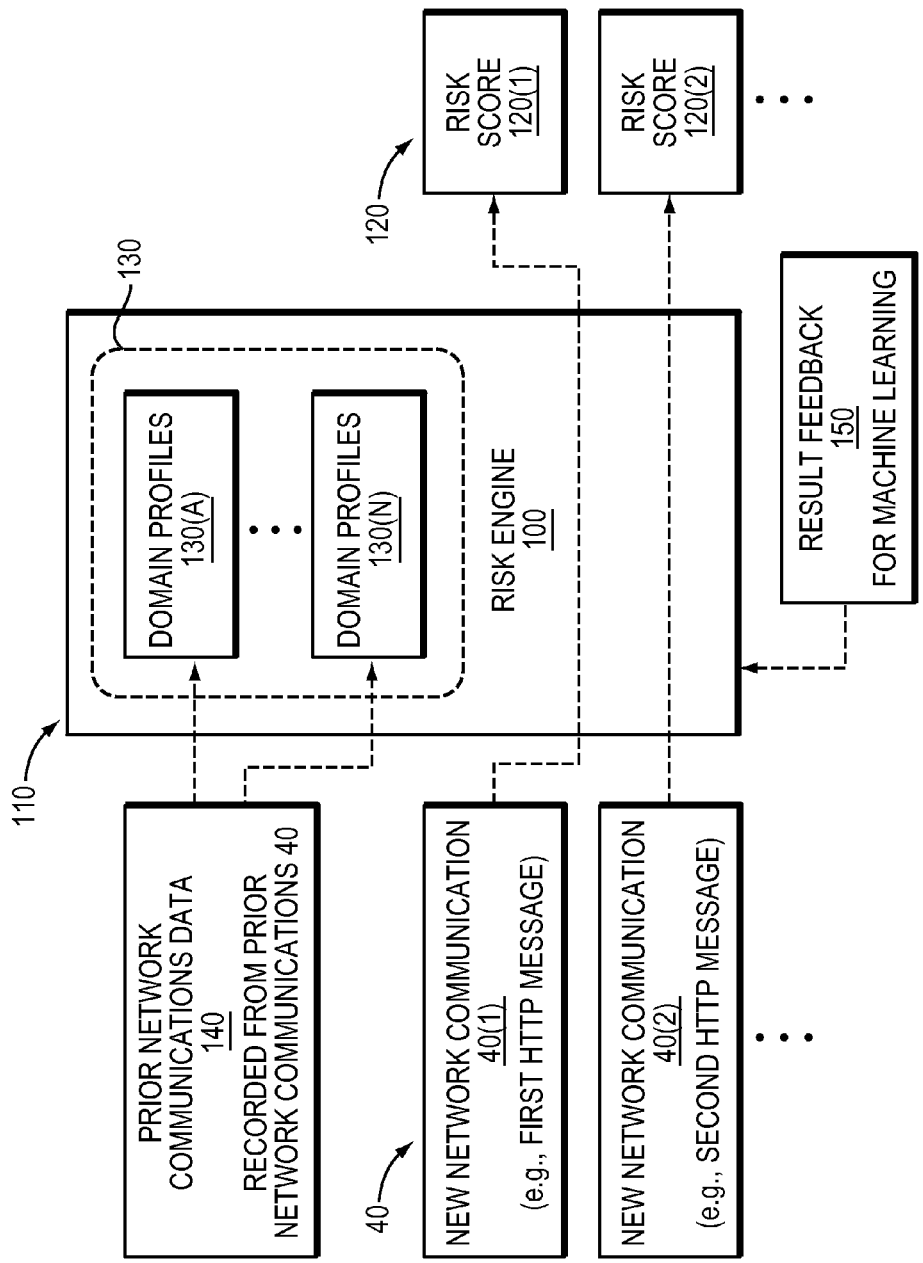
FIG. 3 is a block diagram of particular operating details of the riskiness detection server of FIG. 2.
Figure 4:
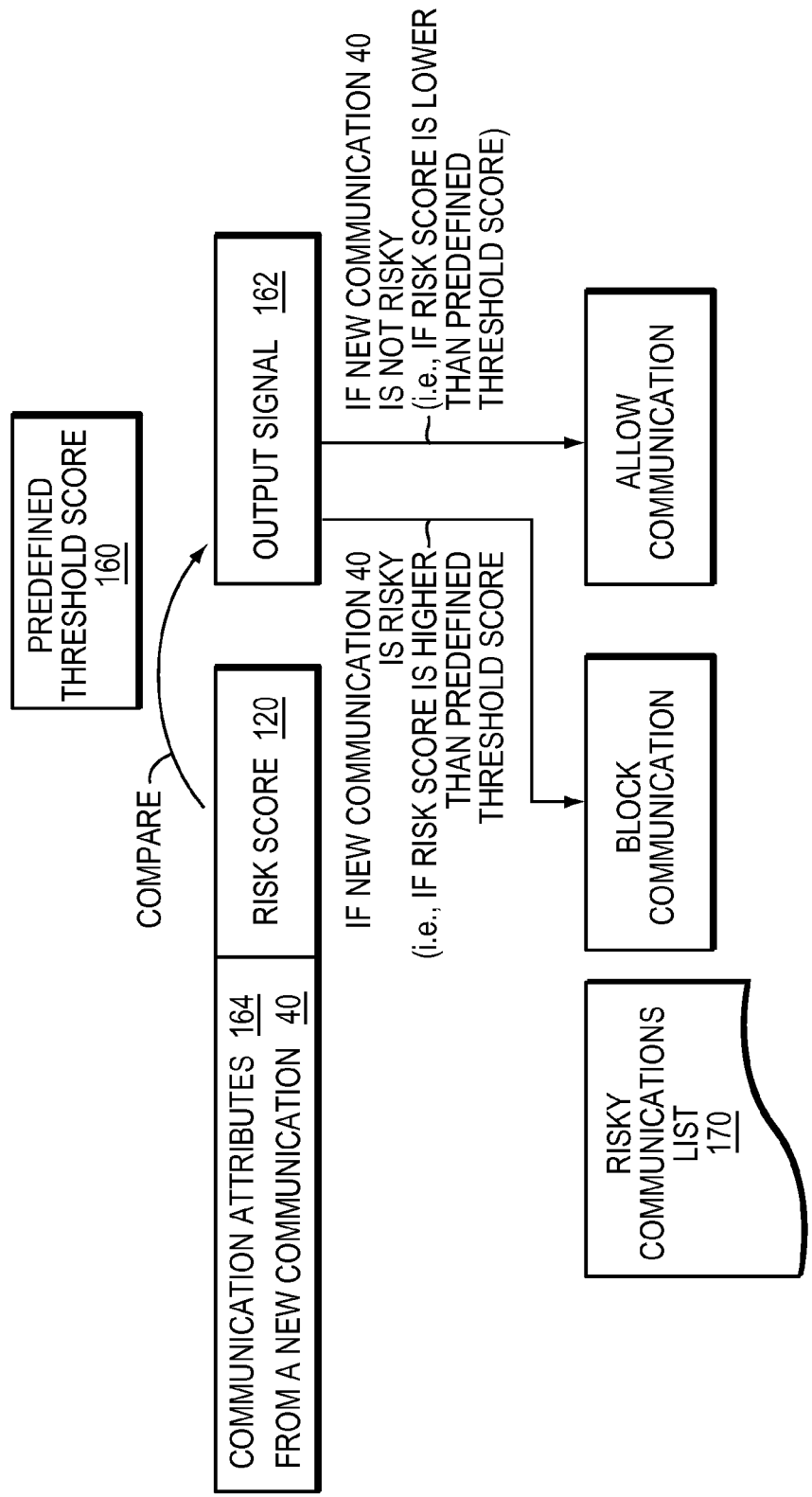
FIG. 4 is a block diagram of further operating details of the riskiness detection server of FIG. 2.

FIGS. 3 and 4 provide particular details of how a risk engine 100 of the riskiness detection server 26 forms domain profiles, determines domain riskiness, and operates to provide security based on domain riskiness.

For illustrative purposes, the operation will be described from the perspective of protecting an organization's enterprise network (e.g., a corporate network). However, it should be understood that the operation is suitable for a variety of other settings (e.g., a home office setting, a SOHO setting, a small business LAN, and so on).

As shown in FIG. 3, the risk engine 100 (i.e., the processing circuitry 54 running the riskiness detection application 64, also see FIG. 2) generates a set of profiles 130(A)-130(N) from prior network communications data 140. In particular, for a period of time (e.g., an initial configuration or learning phase), every communication 40 to any URL from within the organization is recorded with the following information (among others):

Time
Source IP
Destination IP
Domain
HTTP HOST
User Agent String (UAS)
HTTP Method
Full URL
HTTP Status code
Duration
Timezone
Location
Amount of data transmitted and its direction
Referrer and header This recorded information is shown in FIG. 3 as the prior network communications data 140.

It should be understood that the prior network communications data 140 includes a combination of information which is extractable directly from the communications 40 (e.g., HTTP attributes from HTTP messages) and other information which may be derivable from the communications 40. For example, domain location, domain registrar, domain age, employee location, employee department, employee role, etc. Moreover, one will appreciate that, in settings other than the corporate example setting, other attributes are suitable for use as well.

With the prior network communication data 140 now available, the risk engine 100 constructs the domain profiles 130. For example, for a particular domain (e.g., website.com), the risk engine 100 can automatically compute the following metrics from the prior network communications data 140 as follows:

Number of distinct Source IPs
Number of distinct Full URLs
Number of distinct User Agent Strings
Percentage of sessions with no referrer
Percentage of sessions with no cookie
Number of distinct content types that were transferred
Percentage of POST requests
Ratio of sent data and received data It should be understood that each of these profiles on its own tells us important information on the respective domains. For example, domains with many distinct source IPs and user agent strings are probably more popular than those with less. This fact, and others, can be used to determine the riskiness of this domain.

After the profiles 130 have been created, the next step is to train a machine-learning-based risk model (not shown) using the domain profiles and prior knowledge (e.g., domains with thousands of users are rarely malicious) and apply this model to the domains to estimate their riskiness. Since most of the domains are not tagged as malicious or benign, an unsupervised approach may be applied to train the model.

It should be understood that the risk engine 100 may be able to identify risky domains via anomaly detection and pattern matching. Along these lines, the risk engine 100 may be able to automatically compute certain posterior probability factors for a domain. Using these posterior probabilities, the risk engine 100 may be capable of automatically performing anomaly detection as follows:

Anomaly detection techniques evaluate the anomalous of a domain (specifically, a naïve approach with geometric mean was applied). More formally, entities with unexpected values or set of values may be malicious sites. Hence, the overall posterior probability of the entity attributes' values are extracted. Both unconditional and conditional probabilities are used, that is, $P(X=X_i)$ and $P(X=X_i|Entity=Entity_j)$. The risk score of the entity is based on the normalized distance of the posterior probability from a pre-defined threshold. The threshold can be dynamically set per entity. For example, a domain with many different user-agents that communicate with it, but only few distinct users, will likely have a high anomaly score and will be handled as suspicious.

Additionally, using the posterior probabilities, the risk engine 100 may be capable of performing pattern matching as follows:

Prior knowledge is used to evaluate the prior-riskiness of a domain. Specific patterns that are suspected to be the fingerprint of malicious sites are detected. If entity attributes have a high similarity to one of these pre-defined patterns, then this entity is suspicious and should be investigated. These patterns can also be learned from the data and analyst feedback by extracting patterns that are common to malicious entities. For example:

i. A domain that receives large amounts of data and sends low amounts of data is riskier than a domain that mostly sends data. This is because benign domains usually send data in response to small users' requests.

ii. A domain that is rarely being approached with a referrer (i.e., redirected from another site) is riskier than a domain that has a lot of communication that include referrer. This is because malware usually connect directly to their C&C server and do not use referrers, unlike normal web surfing.

It should be noted that a final domain risk score may be computed based on a combination of the domain anomalous level and its pattern-matching score (how well it fits prior risk indicators). This final domain risk score enables a ranked list of suspicious domains to be generated.

In at least one embodiment, it should be understood that the risk engine 100 can also be adjusted by feedback 150 (e.g., earlier risk engine results) that can be input back into the risk engine 100.

FIG. 4 shows operations performed by control circuitry of the riskiness detection server 28 after the riskiness of the domains has been established. The control circuitry processes new communications 40(1), 40(2) by generating communication risk scores 120 for these new communications. It should be understood that the risk scores 120 may be dependent on the riskiness of the domains. For example, if the new communications 40 attempt to access domains that have been classified as risky by the server (see FIG. 3) then the risk scores 120 for the new communications will be high. The server can further output a signal 162 indicating whether that communication risk score 120 is above or below a predefined threshold score 160. When the communication risk score 120 is above the predefined communication threshold 160, the output signal 162 indicates that the corresponding communication 40 is risky. However, when the communication risk score 120 is below the predefined communication threshold 160, the output signal 162 indicates that the corresponding communication 40 is not risky.

It should be understood that the output signal 162 can be used for a variety of purposes. For example, in the context of real-time operation, the output signal 162 can be used to block or allow the new communication 40 to pass from one network port to another. Additionally, in the context of malicious event investigation, the output signal 162 can be used as a trigger to log the attributes 164 of the new communication 40 for later evaluation by a security analyst. Furthermore, such logging of the communications attributes 164 on a list 170 enables the new communications 40 be prioritized so that the communications 40 with the highest communication risk scores 120 (i.e., the communications 40 considered the most risky) are analyzed ahead of less risky but still suspicious communications 40.

In some arrangements, the output signal 162 determines whether code should be injected into the new communication 40 for closer analysis. In particular, if the new communication 40 is deemed risky due to its communication risk score 120 exceeding the predefined communication threshold 160, the riskiness detection server 26 inserts code (e.g., javascript, identifiers, character strings, tracking information, etc.) into the communication 40 to gain further information from one side of the communication, the other, or both. For example, the riskiness detection server 26 can gather additional information about a particular user, URL, etc. to determine whether that entity has a genuine purposes such as performing real work, or whether that entity is malicious. Further details will now be provided with reference to FIG. 5.

Figure 5:
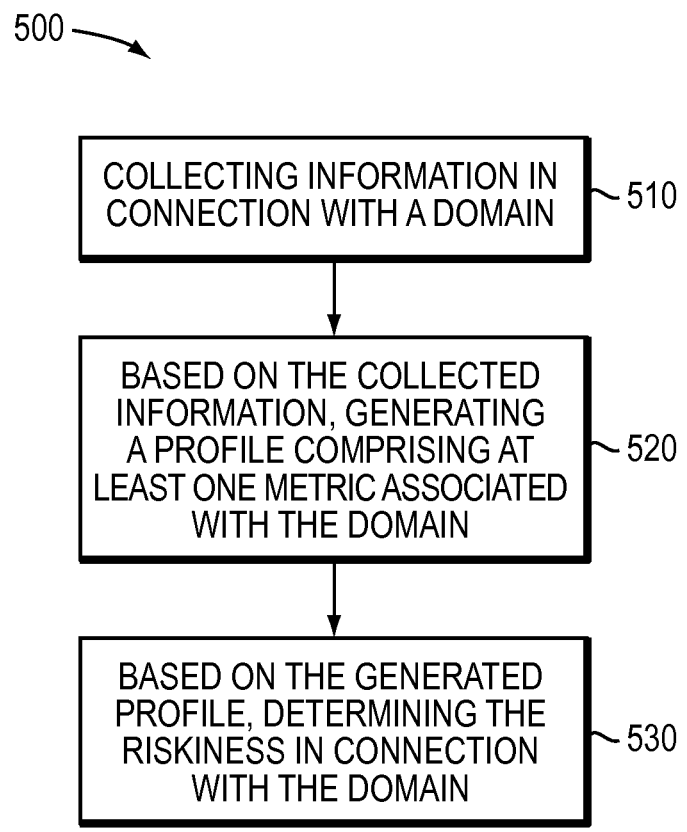
FIG. 5 is a flowchart of a procedure which is performed by the riskiness detection server of FIG. 2.

FIG. 5 is a flowchart of a procedure 500 which is performed by the riskiness detection server 26. At step 510, the procedure collects information in connection with a domain. At step 520, the procedure generates a profile comprising at least one metric associated with the domain based on the collected information. At step 530, the procedure determines the riskiness in connection with the domain based on the generated profile.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Along these lines, the various computer resources of the riskiness detection server 26 may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

What is claimed is:

1. A computer-implemented method, comprising:
    collecting information in connection with a domain, wherein the information relates to access to a web site by at least one communication;
    based on the collected information, generating a profile comprising at least one metric associated with the domain, wherein the profile comprises a domain profile relating to the website that includes count and/or frequency data aggregated over at least one time period; and
    based on the generated profile, determining a riskiness in connection with the domain;
    wherein determining the riskiness in connection with the domain, comprises:
        performing an anomaly detection operation to gauge difference between the generated profile and normal domain behaviour;
        performing a pattern matching operation to gauge difference between the generated profile and abnormal domain behaviour;
        the riskiness being based at least in part on (i) the gauged difference between the generated profile and the normal domain behaviour and (ii) the gauged difference between the generated profile and the abnormal domain behaviour.

2. The method as claimed in claim 1, wherein collecting information comprises extracting information from communications in connection with the domain.

3. The method as claimed in claim 2, wherein extracting information comprises extracting HTTP-based attributes from communications with the domain.

4. The method as claimed in claim 1, wherein generating the profile comprises determining the number of communications with distinct source IP addresses that have communicated with the domain.

5. The method as claimed in claim 1, wherein generating the profile comprises determining the number of communications with distinct full uniform resource locators (URLs) that have communicated with the domain.

6. The method as claimed in claim 1, wherein generating the profile comprises determining the number of communications with distinct user agent strings that have communicated with the domain.

7. The method as claimed in claim 1, wherein generating the profile comprises determining the number of communications with no referrer that have communicated with the domain.

8. The method as claimed in claim 1, wherein generating the profile comprises determining the number of communications with no cookie that have communicated with the domain.

9. The method as claimed in claim 1, wherein generating the profile comprises determining the number of communications with distinct content types that have communicated with the domain.

10. The method as claimed in claim 1, wherein generating the profile comprises determining the number of communications with POST requests that have communicated with the domain.

11. The method as claimed in claim 1, wherein generating the profile comprises determining the amount of sent and received data associated with the domain.

12. The method as claimed in claim 1, wherein generating the profile comprises determining information relating to the registration of the domain.

13. The method as claimed in claim 1, wherein determining the riskiness comprises determining a risk score in connection with the domain.

14. The method as claimed in claim 13, wherein the risk score is determined based on anomaly detection.

15. The method as claimed in claim 13, wherein the risk score is determined based on pattern matching.

16. The method as claimed in claim 13, wherein the risk score is determined based on anomaly detection and pattern matching.

17. An apparatus, comprising:
at least one processing device, said at least one processing device comprising a processor coupled to a memory;
wherein the apparatus is configured to:
collect information in connection with a domain, wherein the information relates to access to a website by at least one communication;
based on the collected information, generate a profile comprising at least one metric associated with the domain, wherein the profile comprises a domain profile
relating to the website that includes count and/or frequency data aggregated over at least one time period; and
based on the generated profile, determine a riskiness in connection with the domain;
wherein determining the riskiness in connection with the domain, comprises:
performing an anomaly detection operation to gauge difference between the generated profile and normal domain behaviour;
performing a pattern matching operation to gauge difference between the generated profile and abnormal domain behaviour;
the riskiness being based at least in part on (i) the gauged difference between the generated profile and the normal domain behaviour and (ii) the gauged difference between the generated profile and the abnormal domain behaviour.

18. A computer program product having a non-transitory computer-readable medium storing instructions, the instructions, when carried out by one or more processors, causing the one or more processors to perform a method of:
collecting information in connection with a domain, wherein the information relates to access to a web site by at least one communication;
based on the collected information, generating a profile comprising at least one metric associated with the domain, wherein the profile comprises a domain profile relating to the website that includes count and/or frequency data aggregated over at least one time period; and
based on the generated profile, determining a riskiness in connection with the domain;
wherein determining the riskiness in connection with the domain, comprises:
performing an anomaly detection operation to gauge difference between the generated profile and normal domain behaviour;
performing a pattern matching operation to gauge difference between the generated profile and abnormal domain behaviour;
the riskiness being based at least in part on (i) the gauged difference between the generated profile and the normal domain behaviour and (ii) the gauged difference between the generated profile and the abnormal domain behaviour.

\* \* \* \* \*